2 Sheets--Sheet 1.
A. P. PITKIN.
Heating and Ventilating Public Buildings.
No. 164,933. Patented June 29, 1875.
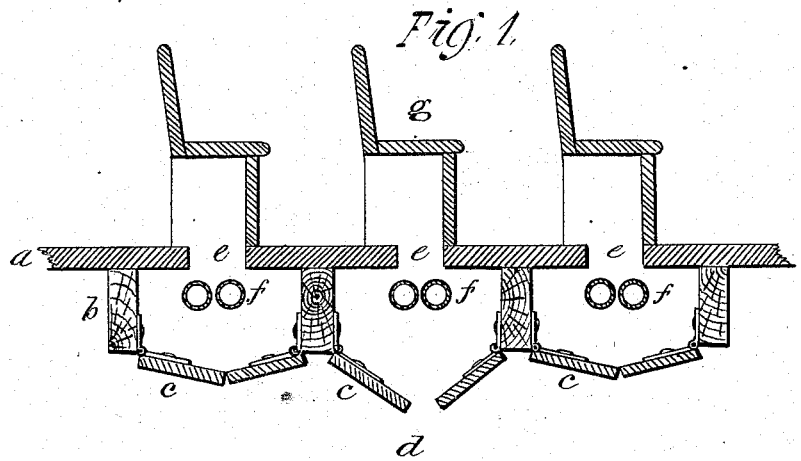
Fig. 1
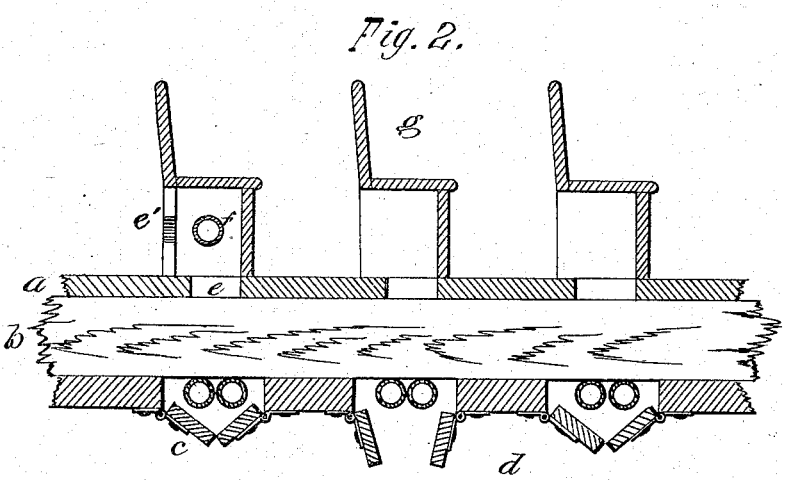
Fig. 2
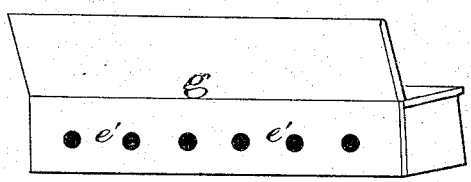
WITNESSES.
INVENTOR.

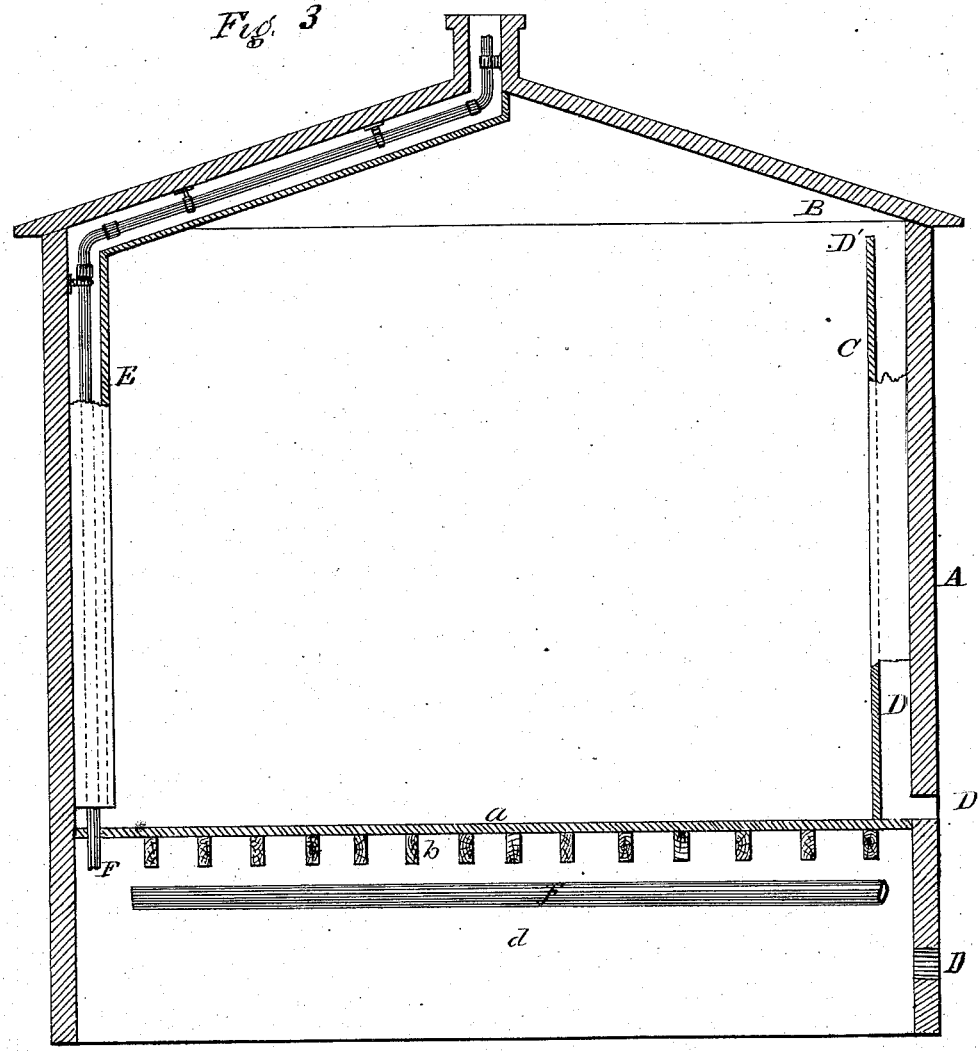

UNITED STATES PATENT OFFICE.

ALBERT P. PITKIN, OF HARTFORD, CONNECTICUT.

IMPROVEMENT IN HEATING AND VENTILATING PUBLIC BUILDINGS.

Specification forming part of Letters Patent No. 164,933, dated June 29, 1875; application filed January 25, 1875.

*To all whom it may concern:*

Be it known that I, ALBERT P. PITKIN, of the city and county of Hartford, and State of Connecticut, have invented certain new and useful improvements in heating and circulating fresh air, and ventilating halls, churches, and other public buildings, and registers or openings for feet at each sitting; and to enable others skilled in the art to make the same I will proceed to describe, referring to the drawings, in which the same letters refer to like parts in each of the figures.

The nature of this improvement consists in introducing warm air directly to the feet of each sitting or occupant of a hall, church, or other public building, and of supplying and circulating fresh air, and removing foul impure air therefrom.

Figs. 1 and 2 are section views of the seats, floor, joists, heat-radiating pipes, and air-regulating adjusters $c$. Fig. 3 is a side elevation of a room, showing how the impure air is expelled therefrom and how the fresh air is introduced.

$a$ is the floor of the apartment to be heated. $b$ are the floor-joists. $c$ are the adjusters, to be opened more or less from the air-chamber $d$ to regulate the passage or flow of warm fresh air to the openings $e$ under the seats $g$. $f$ are heating-pipes, which are arranged under the seats, above or below the floor, and between or below the floor-timbers $b$. $g'$ is a seat, under which the heat-radiating pipes are placed when placed above the floor, and the heat is discharged through the registers or openings $e'$ above the floor. Then the openings $e$ are used for conducting cold air or fresh air, and the heat is discharged through the registers or openings $e'$. The openings $e$ are so arranged relative to the seats that the feet of the occupants may easily be placed upon or over them. A is the wall of the building; B, the ceiling or upper portion of the room. C is a box, to receive and conduct fresh air from the opening D through the wall, and deliver it at D' near the top of the room. The flue E is arranged at the side of the wall, and is for the purpose of delivering moist, heavy, or foul air or gases. The radiating-pipe F is to rarefy the air in the flue E, and thereby create a current sufficient to take out the foul air, or heavy air or gases, which is facilitated by a steam-jet delivered through the pipe F, near the top of the flue E, causing a strong draft from below.

By this arrangement I produce a fresh warm atmosphere, and avoid the necessity of sitting during the delivery of a discourse or lecture with cold feet; also avoiding the risk of contracting a severe cold or other sickness from cold feet. The large air-chamber below, and the great number of registers or openings, prevent all strong draft or current of air in any one place, but produces a gentle rising of mild warm air throughout the entire room.

I do not claim placing radiating-pipes in chambers below the floor, or radiating-pipes under the seats in the room above, for this may have been done before; but

What I claim, and desire to secure by Letters Patent, is—

The heating-pipes $f$, combined with seats $g$ and floors $a$, having apertures or openings $e$, and with the adjusters $c$ opening into air-space $d$, the whole forming a system of heating and ventilation, and constructed and operating substantially as set forth.

ALBERT P. PITKIN. [L. S.]

Witnesses:
A. M. WALLACE,
JEREMY W. BLISS.